(12) United States Patent
Egan

(10) Patent No.: US 8,049,621 B1
(45) Date of Patent: Nov. 1, 2011

(54) METHOD AND APPARATUS FOR REMOTE MERCHANDISE PLANOGRAM AUDITING AND REPORTING

(75) Inventor: Doug Egan, Grayslake, IL (US)

(73) Assignee: Walgreen Co., Deerfield, IL (US)

( * ) Notice: Subject to any disclaimer, the term of this patent is extended or adjusted under 35 U.S.C. 154(b) by 364 days.

(21) Appl. No.: 12/473,969

(22) Filed: May 28, 2009

(51) Int. Cl.
  *G08B 13/14* (2006.01)
(52) U.S. Cl. ......... 340/572.1; 340/572.5; 340/5.91; 340/5.92; 340/10.32; 340/568.1; 340/539.13; 235/375; 235/383; 235/385; 235/492; 705/22; 705/23; 705/28
(58) Field of Classification Search .......... 340/572.1, 340/572.5, 572.77, 10.32, 5.92, 568.1, 539.13; 235/375, 383, 385, 492; 705/22, 23, 28
See application file for complete search history.

(56) References Cited

U.S. PATENT DOCUMENTS

| | | | |
|---|---|---|---|
| 6,552,663 | B2 | 4/2003 | Swartzel et al. |
| 7,287,001 | B1 * | 10/2007 | Falls et al. ............ 705/22 |
| 7,443,295 | B2 * | 10/2008 | Brice et al. ............ 340/568.5 |
| 7,493,336 | B2 | 2/2009 | Noonan |
| 2009/0101712 | A1 | 4/2009 | Ulrich et al. |

FOREIGN PATENT DOCUMENTS

WO  WO-2009/029596 A2  3/2009

* cited by examiner

*Primary Examiner* — Tai T Nguyen
(74) *Attorney, Agent, or Firm* — Francis C. Kowalik; Marshall, Gerstein & Borun LLP

(57) ABSTRACT

A system for remotely reading embedded RFID tags may generally facilitate the retail facility planogram auditing process. A set of RFID tags embedded with products displayed for sale at a retail facility may be provided and configured to store associated product information. An array configured to read the stored associated product data and triangulate the positions of the embedded tags may be located within range of the retail facility. The collected product data and triangulated positions may then be used by the system to audit the retail facility's compliance with a predetermined planogram. The audit results may be thereafter stored in a computer medium, aggregated in accordance with a predetermined format, communicated to personnel, and provided in a reviewable format via a user interface.

12 Claims, 7 Drawing Sheets

US 8,049,621 B1

METHOD AND APPARATUS FOR REMOTE MERCHANDISE PLANOGRAM AUDITING AND REPORTING

TECHNICAL FIELD

The present disclosure relates generally to retail merchandise management; more particularly it relates to a method and apparatus for collecting and auditing information regarding a retail facility's compliance with predetermined product assortment and placement plans.

BACKGROUND

It is the practice of some retailers to formulate and execute custom product assortment and product placement plans, or planograms, for individual retail facilities. A planogram indicates the assortment of products to be offered for sale at the facility, the placement of those products within the facility's sales floor, and the amount of display space devoted to each product, often measured in linear feet of shelf space. In creating planograms, retailers often draw on known demographic, sales history, or other data to predict demand preferences of a facility's customers. Because demand varies among facilities, a retailer may create and implement a wide variety of corresponding planograms. Planners may update planograms by subscribing facilities to receive revisions at regular intervals based on a predicted variation in demand. For instance, a retailer may wish to alter a planogram to offer seasonal items, to respond to demographic changes in the facility's customer base, or to test the effectiveness of an alternative product assortment or placement configuration. Centralized planograming is thus an important tool in effectively managing retail inventory and increasing sales.

After a planogram has been implemented, planners may collect and analyze sales data in order to optimize future product offerings. Planners are interested in identifying particular product placement configurations, or adjacencies, that maximize sales. They are also interested in identification of products that are more attractive to, and thus more profitable in, certain demographic regions. Planogram-based sales data is also valuable to product manufacturers and suppliers, who may wish to adjust characteristics of their products to maximize appeal to shoppers. This information may be sold by retailers to manufacturers or used by retailers to secure more favorable terms in their commercial dealings with the manufacturers.

Knowledge of a retail facility's compliance with a planogram is an important factor in collecting viable planogram-based sales data. It is therefore desirable for planners to monitor compliance in such a way as to provide a highly accurate and highly current picture of the state of a facility's stocking configuration as it relates to its planogram. Planogram revisions may be frequent if a facility is operating under a subscription model, and inefficient monitoring may unduly delay the reporting of planogram-based data. Efficient planogram compliance monitoring therefore requires a timely flow of organized information from the retail facility to the planners. Specifically, planners wish to know whether a facility has been delinquent in implementing a planogram, whether the planogram was implemented incompletely, or whether it was implemented incorrectly.

Systems and methods have been developed for monitoring planogram compliance. These systems, however, depend primarily on manual inspection conducted on a sales floor. Manual inspection is time consuming, expensive, and prone to error. The resulting audit information is often unavailable to planners until after the information has become stale. A need therefore exists to automatically and accurately monitor retail facility planogram compliance remotely with a high frequency of reporting. Ideally, the reporting frequency would be high enough to supply a "real time" view of the facility's compliance.

One well known and widely used method of gathering data relating to retail merchandise generally is the use of radio-frequency-identification (RFID) tags. RFID tags in the retail context often electronically store data relating to a product or products that can later be read using radio waves. RFID tag readers modulate and demodulate radio waves that are transmitted and received via an antenna or an array of antennas. When an RFID tag passes within range of an antenna, the reader collects information embedded in the tag.

Two types of RFID tags are generally available: active and passive. Passive tags rely solely on the powered antennas to provide the radio waves. Active tags are equipped with a power source, usually a battery, and call out or signal at predetermined intervals. Active tags enjoy an increased range over passive tags, but at a greater cost per tag. In some configurations, the additional cost of powered tags is offset by savings created by a reduction of the number of necessary antennas. In other configurations, active tags are necessary to overcome environmental conditions that may interfere with the radio signal, such as a large amount of metals or liquids.

DETAILED DESCRIPTION

FIGS. 1-6 illustrate embodiments of a system and method for remotely auditing and reporting retail planogram compliance. In general, the system described herein allows retail planners to frequently and efficiently audit planogram compliance from a remote location. Particularly, the system may be used to identify products displayed for sale on a sales floor, collect information associated with the products stored in embedded RFID tags, determine the sales floor location of those products, and determine the merchandise configuration's level of compliance with a predetermined planogram. The system is applicable to a wide range of retail environments, including any retailer stocking a sales floor with reference to a planogram. Although the following description refers in particular to a retail facility organized by product department with a subset of departments occupying each isle in the facility, it should be recognized that the system is applicable to any type of retail facility stocking configuration.

Figure 1A:
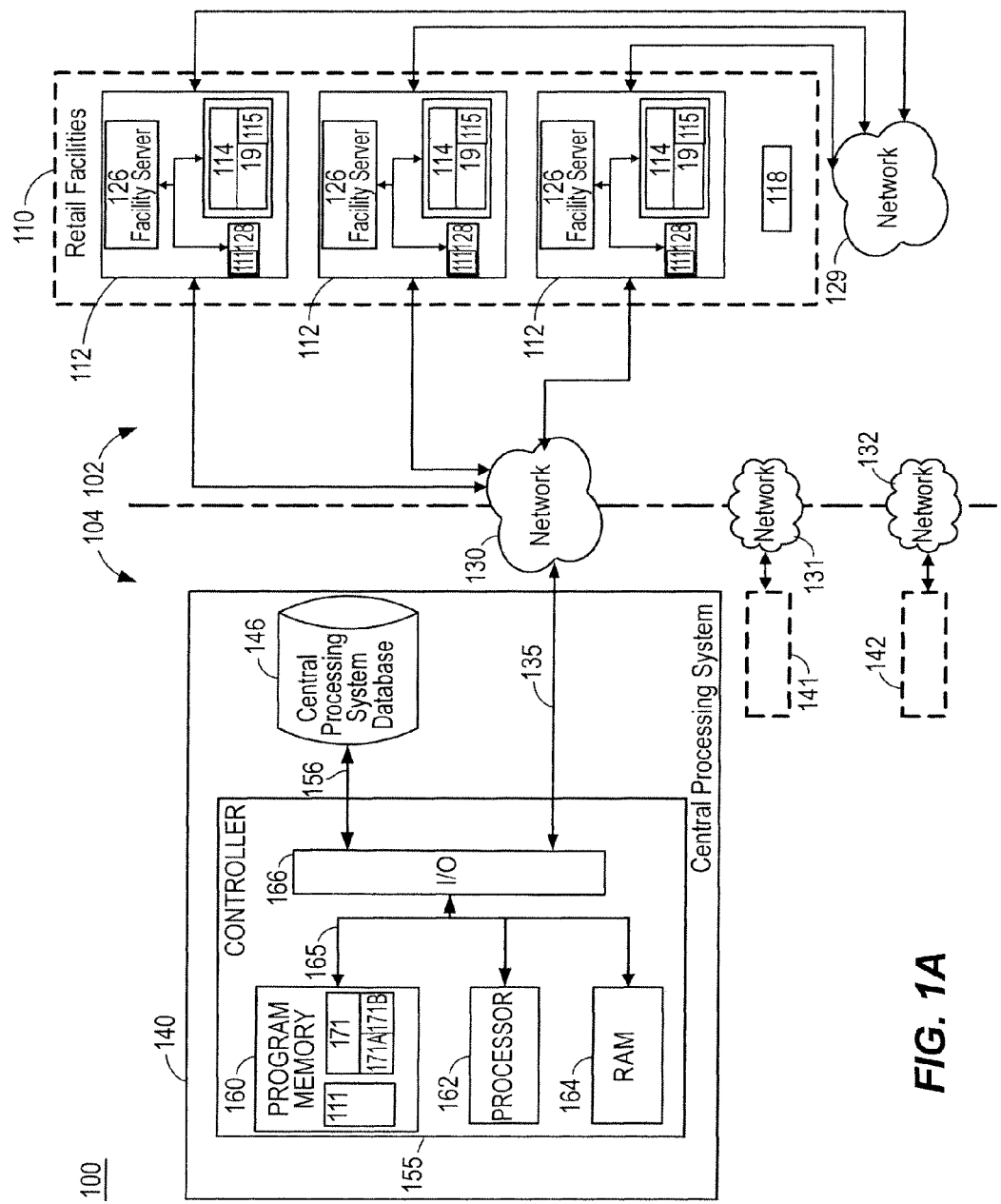
FIGS. 1A and 1B illustrate block diagrams of a computer network and system on which an exemplary planogram auditing and reporting system and method may operate in accordance with the described embodiments.
Figure 1B:
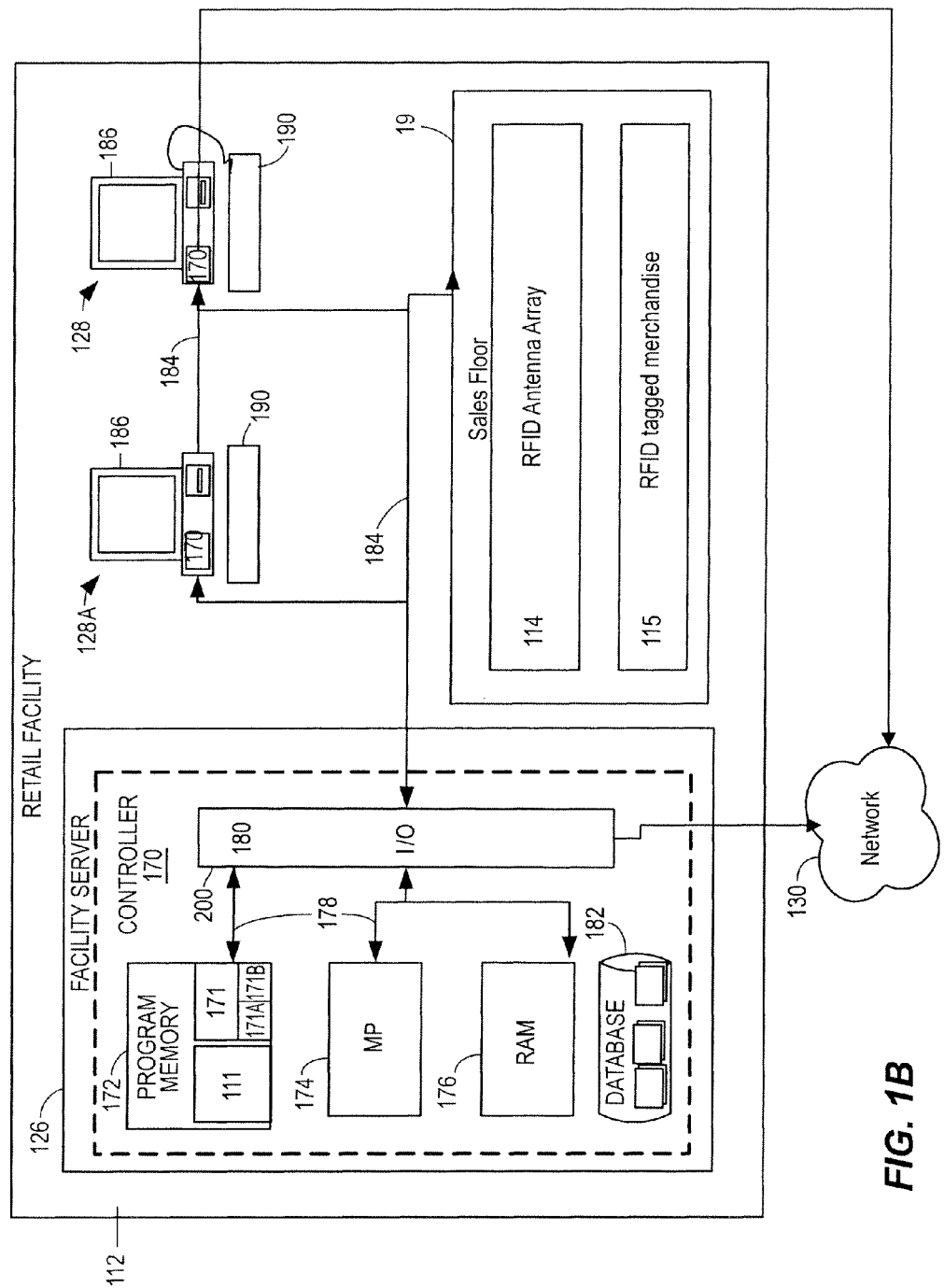

FIGS. 1A and 1B illustrate various aspects of an exemplary architecture implementing a planogram audit and compliance report system 100. FIG. 1A illustrates a high-level block diagram of the system. The top level architecture includes hardware components and software components operatively connected via various digital communications channels. The system 100 may be roughly divided into two types of components: a set or sets of central components 104, and sets of deployed components 102. The deployed components 102 are primarily disposed within a retail network 110 including one or more individual retail facilities 112 that may be located in separate geographical locations. The set of central components is primarily disposed in a single physical location, with some components optionally located physically separately.

FIG. 1A depicts an embodiment of a central processing system 140, part of the central components 104, at a central processing facility. The central processing system 140 may have a controller 155 operatively connected to a central processing system database 146 via a link 156 connected to an input/output (I/O) circuit 166. The controller 155 includes a program memory 160, a processor 162, a random-access memory (RAM) 164, and the input/output (I/O) circuit 166, all of which are interconnected via an address/bus 165. The processor 162 may be referred to in the alternative as either a microcontroller or microprocessor. The processor 162 is adapted and configured to execute various software applications and manage components of the planogram audit and report system 100 in addition to other software applications or tasks. The RAM(s) 164 and the program memory 160 may be implemented as semiconductor memories, magnetically readable memories, or optically readable memories. A link 135 operatively connects the controller 155 to the digital network 130 through an I/O circuit 166. The database 146 is adapted to store data collected and created during planogram auditing and reporting. The central processing system 140 accesses data stored in the database 146 when executing various functions and tasks associated with the operation of the planogram auditing and reporting system 100 and method 200.

A digital network 130 communicatively connects to the central processing system to the deployed components 104 through an I/O circuit 166. Digital network 130 may be a proprietary network, a secure public Internet, a virtual private network or some other type of network, such as dedicated access lines, circuit switched telephone lines, satellite links, or any combination of the foregoing. Where the digital network 130 comprises the Internet, data communication may be according to an Internet communication protocol.

The program memory 160 may contain a planogram audit and report engine 171 for execution within the processor 162. The planogram audit engine 171 may execute various tasks and programs associated with the planogram auditing and reporting method (described in more detail below with reference to FIG. 4), and may be a single module 171 or a plurality of modules 171A, 171B. By way of example, the planogram auditing and reporting engine 171, or the modules 171A and 171B, may: receive planogram data related to a retail location, compare the collected data to a planogram on file for the selected retail location, determine if the retail location is in compliance with the predetermined planogram, aggregate the compliance and deviation results in accordance with a predetermined reporting format, send the data to a plurality of recipients, including, for example, central planners or staff at the selected retail facility, issue revised planograms based on a subscription model, or notify staff or planners of future planogram revisions.

The deployed components 102 consist of a retail network 110 and a network or networks 129, 130 communicatively connected to the central components 104. In addition to any number of retail facilities, retail network 110 may include one or more warehouses or stocking facilities 118. The warehouses or stocking facilities 118 may distribute merchandise to the various retail facilities 112 in the retail network 110, or may distribute directly to customers. Each retail facility may include a local facility server 126, local computers 128 or terminals 128A, and an RFID antenna array 114 disposed above a sales floor 19 containing merchandise with embedded RFID tags 115. The retail facilities may contain additional components, discussed in greater detail with reference to FIG. 1B below.

Although FIG. 1A shows an embodiment with three retail locations, one retail network, and a single microprocessor in the controller, the system may include any number of these components or other components. For instance, FIG. 1A depicts the central processing system 140 in communication with two additional sets of separately located central components 141, 142 connected to the digital networks 131, 132. In this embodiment, the configuration may provide advantages such as redundant system capabilities and independent data storage, preserving system availability and historical data if one of the databases is lost. Any databases in the additional sets may be linked to the controller 155 in a known manner. Likewise, the controller may include multiple microprocessors 162, RAMS 164, or program memories 160. The I/O circuit 166, shown as a single block, may include a number of different I/O circuits.

FIG. 1B depicts an embodiment of the deployed components 102 located in one or more of the retail facilities 112 from FIG. 1A. Although the following description addresses the design of the retail facilities 112, it should be understood that the design, structure, or method of operation of the facilities may differ from one another. It should also be understood that the embodiment shown in FIG. 1B illustrates only some of the components and data connections that may be present in a retail facility 112. For exemplary purposes, a preferred retail facility design is described, even though numerous other designs may be utilized. A retail facility 112 may comprise a number of facility servers 126, workstations 128, and RFID antenna arrays 114 disposed above a sales floor 19 containing merchandise with embedded RFID tags 115. The facility server 126 communicates with the RFID antenna arrays 114 and the central components 104 via the digital network 130. In addition to the central processing system database 146, the facility servers 126 may also store related data on a local database 182. The facility servers 126 may execute programs or routines associated with the auditing engine and method (FIGS. 4 and 5, described in more detail below) instead of execution of these routines by the central processing system controller 155. A local digital network 184 may operatively connect the RFID antenna arrays 114, workstation 128, and facility server 126. The servers 126 may also execute other retail management applications in connection with the local workstations 128. Retail staff may use the workstations 128 to access facility, stocking, shipping, planogram, employee, compliance, and communication information.

Those of ordinary skill in the art will recognize that the deployed components 102 could utilize a number of client device terminals 128A disposed at the plurality of retail facilities 112 instead of, or in addition to, a plurality of workstations 128. Unless otherwise indicated, any discussion of retail facility computers refers to the facility servers 126, the local workstations 128, and/or the client device terminals 128A. Moreover, in environments other than the retail facilities 112, such as kiosks, call centers, and Internet interface terminals may employ the workstations 128, the client device terminals 128A, and the servers 126. As used herein, the term "retail facility computers" refers to any of these points of contact. Each of the retail facility computers is interconnected by a digital network 184 to the RFID antenna array 114 and the digital network 130. The digital network 184 may be a wide area network (WAN), a local area network (LAN), wireless network, Ethernet, or any other type of digital network readily known to those persons skilled in the art.

Each workstation 128, client device terminal 128A, or facility server 126 includes a controller 170. Similar to the controller 155 shown in FIG. 1A, the controller 170 includes a program memory 172, a microcontroller or microprocessor (MP) 174, a random-access memory (RAM) 176, and an input/output (I/O) circuit 180, all of which are interconnected via an address/data bus 178. As discussed with reference to the controller 155, it should be appreciated that, although FIG. 1B depicts only one microprocessor 174, the controller 170 may include multiple microprocessors 174, multiple RAMs 176, or multiple program memories 172. Although the figure depicts the I/O circuit 180 as a single block, the I/O circuit 180 may include a number of different types of I/O circuits. The controller 170 may implement the RAM(s) 176 and the program memories 172 as semiconductor memories, magnetically readable memories, and/or optically readable memories, for example. In some embodiments, the controller 170 may also include, or otherwise be communicatively connected to, a local database 182. The database 182 (and/or the database 146 of FIG. 1A) includes stored data relating to planograms, planogram audits, planogram reports, and other associated data.

In addition to the controller 170, the workstations 128 or client device terminals 128A may further include a display 186 and a keyboard 190 as well as a variety of other input/output devices (not shown) such as a scanner, printer, mouse, touch screen, track pad, track ball, isopoint, voice recognition system, or digital camera. A retail facility employee may sign onto the workstation 128 or the client device terminal 128A using any available technique, such as entering a user name and password, swiping an identification card, or supplying a fingerprint. If a retail facility employee signs onto the system using a client device terminal 128A, the network 184 communicates this information to the facility server 126, so that the controller 170 may identify which retail facility employees are signed onto the system 100 and which workstation 128 or client device terminal 128A the employee is signed onto.

Various software applications resident in the deployed components 102 and the central components 104 implement the auditing and reporting methods, and provide various user interface means to allow users (i.e., retail facility staff or central planners) to access the system 100. One or more of the deployed components 102 and/or the central components 104 may include a user-interface application 111 allowing a user to input and view data associated with the system 100, and to execute a planogram update, audit, or report. In one embodiment, the user interface application 111 is a web browser client, and the facility server 126 or the central processing system 140 implements a server application 113 for providing data to the user interface application 111. However, the user interface application 111 may be any type of interface, including a proprietary interface, and may communicate with the facility server 126 or the central processing system 140 using any type of protocol including, but not limited to, file transfer protocol (FTP), telnet, hypertext transfer protocol (HTTP), etc. Some embodiments may include the user interface application 111 running on one of the retail facility computers in a retail location 112 (as when a retail facility staff member is accessing the system), while other embodiments may include the application 111 running on an Internet interface terminal (not shown). The information sent to the retail facility computers from the facility server 126 and/or the central processing system 140 includes data retrieved from the database 146. The central processing system 140 and/or the facility server 126 may implement any known protocol compatible with the user-interface application 111 running on the retail facility computers and adapted to the purpose of receiving and providing the necessary planogram information for auditing and reporting via the digital network 130.

Figure 2:
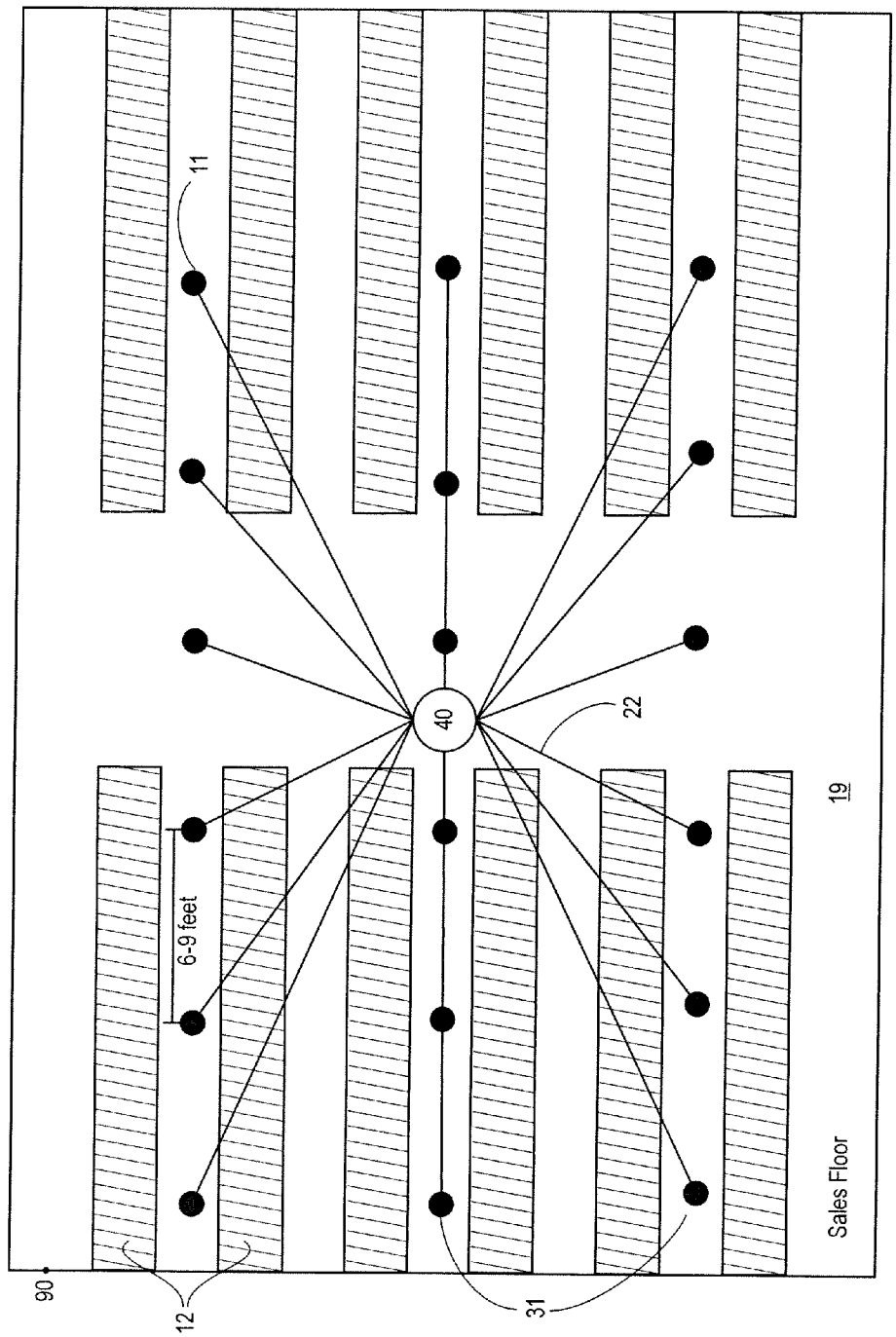
FIG. 2 is schematic diagram of an embodiment of an array of RFID antennas deployed above a sales floor.

Referring now to FIG. 2, the RFID antennas in the array 114 are deployed in an exemplary hub-and-spoke configuration and connected via coaxial cables 22 to a central hub 40. An integrated circuit in the central hub 40 modulates and demodulates radio signals, and is coupled via the digital network 184 to a retail facility computer or server 126. The plurality of antennas 31 may be located, by way of example rather than limitation, in the ceiling above the sales floor as depicted in FIG. 2, spaced approximately 6-9 feet apart. In other embodiments, the array may be deployed in other configurations such as beneath the sales floor, in the walls of the retail facility, inside the shelves 12, or any location within range of the radio antennas 31.

Figure 6:
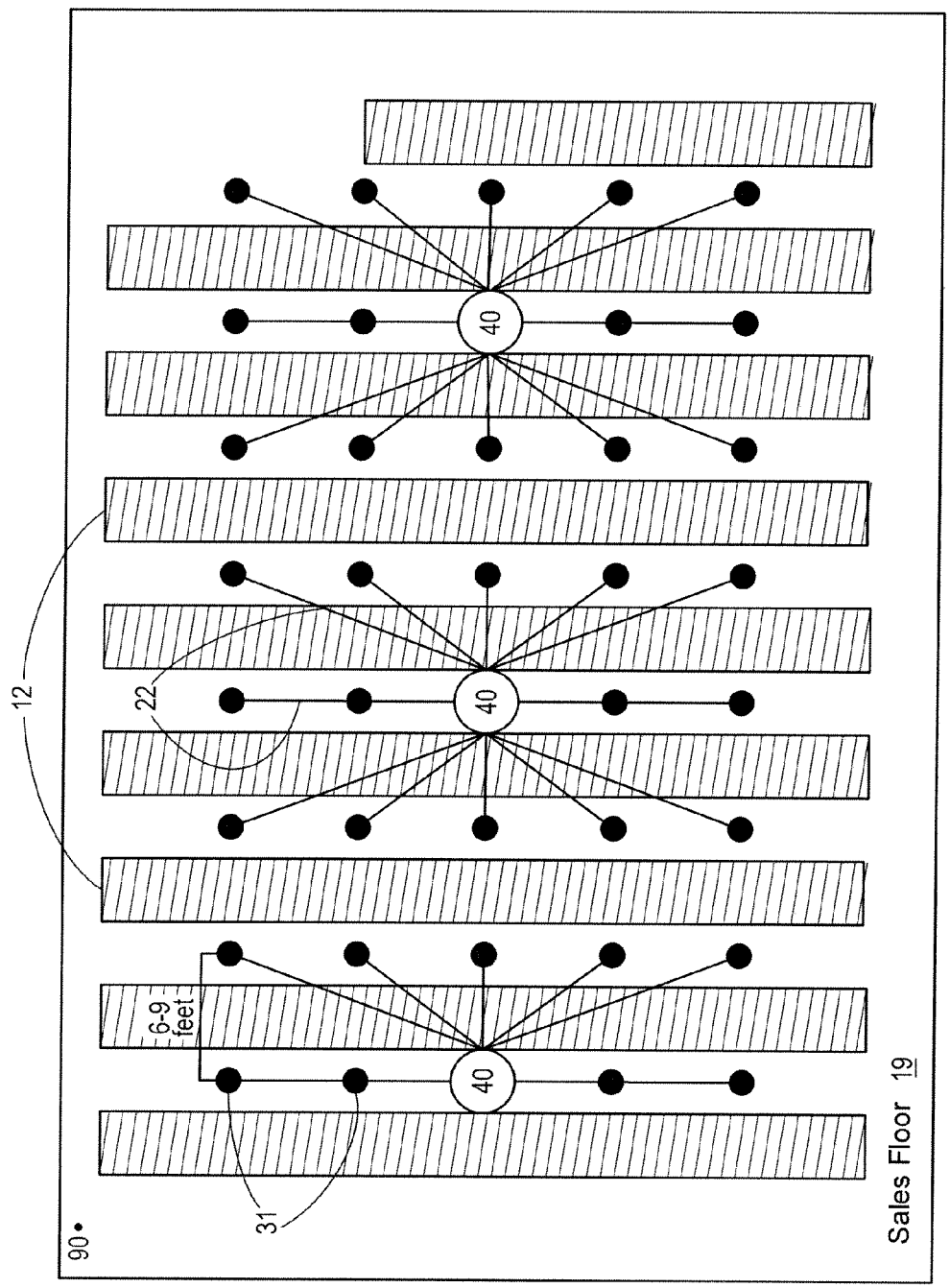
FIG. 6 is a schematic diagram of an alternative embodiment of RFID antennas deployed above a sales floor.

The RFID scanners collect information contained in RFID tags embedded with products on the sales floor (described in greater detail below, and with reference to FIG. 3), and estimate the location of the tags based on triangulation among the various antennas. The antennas may be deployed in more than one orthogonal plane to increase triangulation accuracy and facilitate measurement of a tag's height above the floor in addition to its position in the horizontal plane of the sales floor. The antennas sense the horizontal and vertical coordinates of the tags with respect to a reference location 90 on the sales floor. In some embodiments, the tags contain information relating to the products with which they are embedded including, for example: sale price, price per unit volume, identification number, product name, volume discount price, manufacturer information, sell-by date, department identification, introduction date, linear footage requirement, position codes, and other associated information. An alternative embodiment with like numerals indicating like elements utilizing multiple hubs 40 is shown in FIG. 6.

The RFID tags may be embedded with the products in a variety of configurations. It is preferable to conceal the tags from a customer's view, for aesthetic considerations and to reduce likelihood of customer tampering. A tag may be embedded in a concealed manner inside a promotional display used to display or market products. In another embodiment, a tag may be attached to a product itself. Although embedding a tag on an individual product, the first product in a shipment of products for example, may be disadvantageous because the tag is lost when that strip is sold, planners would still receive snapshots of the tags as new shipments are stocked. In yet another embodiment, the RFID tags are affixed to a shopping basket or cart. The RFID antennas capture the tag's position at various points while the customer carries it on the sales floor. Information gleaned from this approach can be used to analyze typical customer interactions with merchandise and allow planners to further optimize and refine product placement and adjacencies.

Another strategy for RFID tag embedding is to affix the tag to the back of a Planograming Shelf Strip. A Planograming Shelf Strip is a printed material extending along a shelf on which products are displayed for sale. The strip displays product names and associated information at predetermined intervals along the strip corresponding to the locations on the shelf below which the products are to be displayed. The retailer generates a new shelf strip or set of shelf strips for each new planogram or planogram revision, thereby facilitating planogram compliant stocking of a category or department. The Planograming Shelf Strip may be printed in accordance with a retail merchandise stocking configuration based on products organized by category or product type. In this embodiment, a plurality of shelf strips defines a category of products or a sub-category of products for display on a sales floor.

Figure 3:
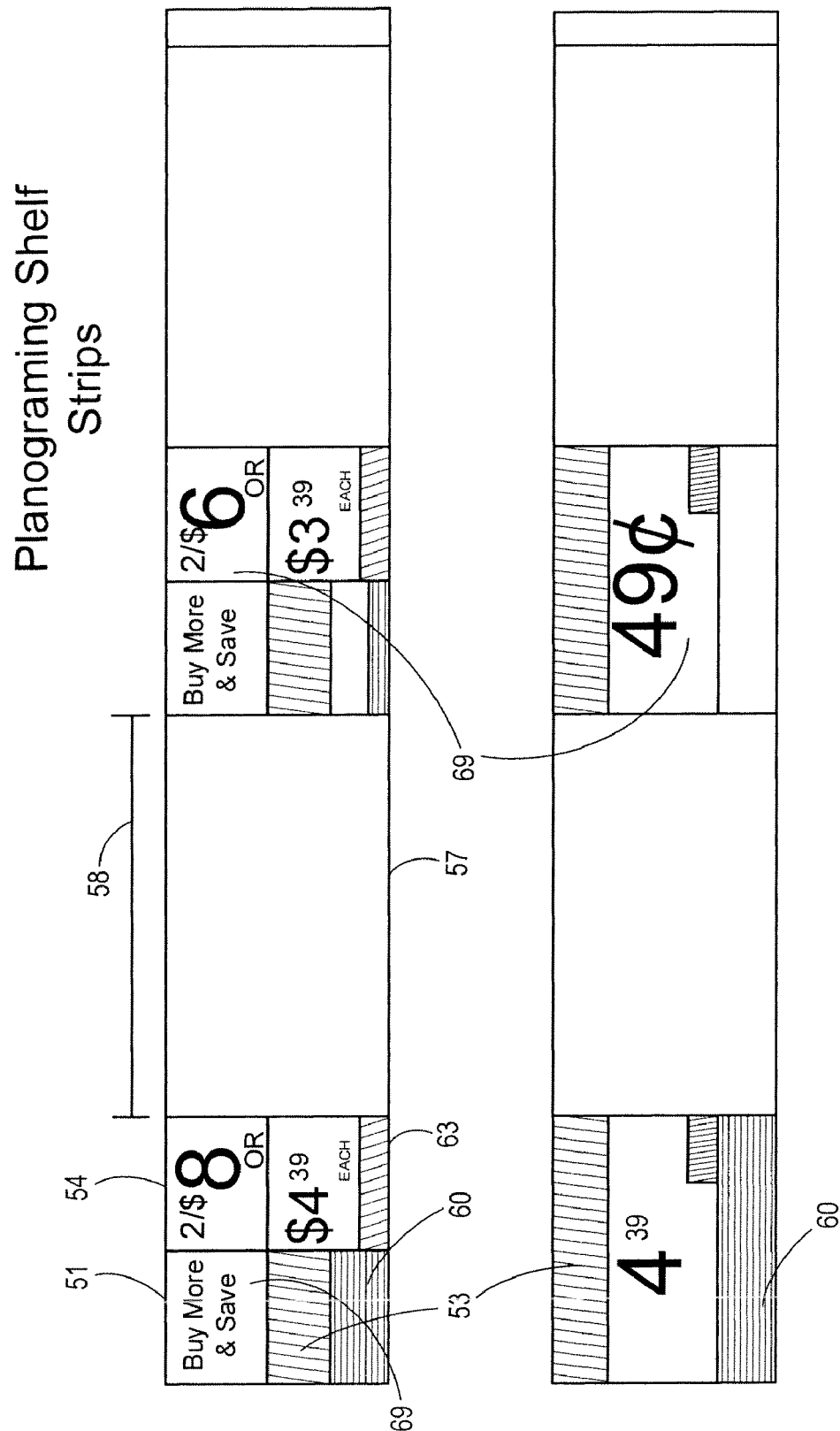
FIG. 3 is a schematic diagram of a Planograming Shelf Strip with an embedded RFID tag.

Referring now to FIG. 3, the Planograming Shelf Strip displays a variety of product information in product information boxes 69, separated by spacers 57 of length 58. Each product information box 69 contains a variety of information relating to the products. For instance, the box may contain advertising copy 51, volume discount price 54, price per unit volume 63, a UPC barcode 60, product name and stocking number 53, displayed in any combination of product or advertising information as desired. The length 58 of the spacer between adjacent product information boxes 69 varies according to the linear feet of shelf space required for the relevant product. The Planograming Shelf Strips may be produced in sections of regular length, such as three feet strips, in order to standardize production and shelf stocking. An RFID tag (not shown) may be affixed to any location on the reverse side of the strip.

Figure 4:
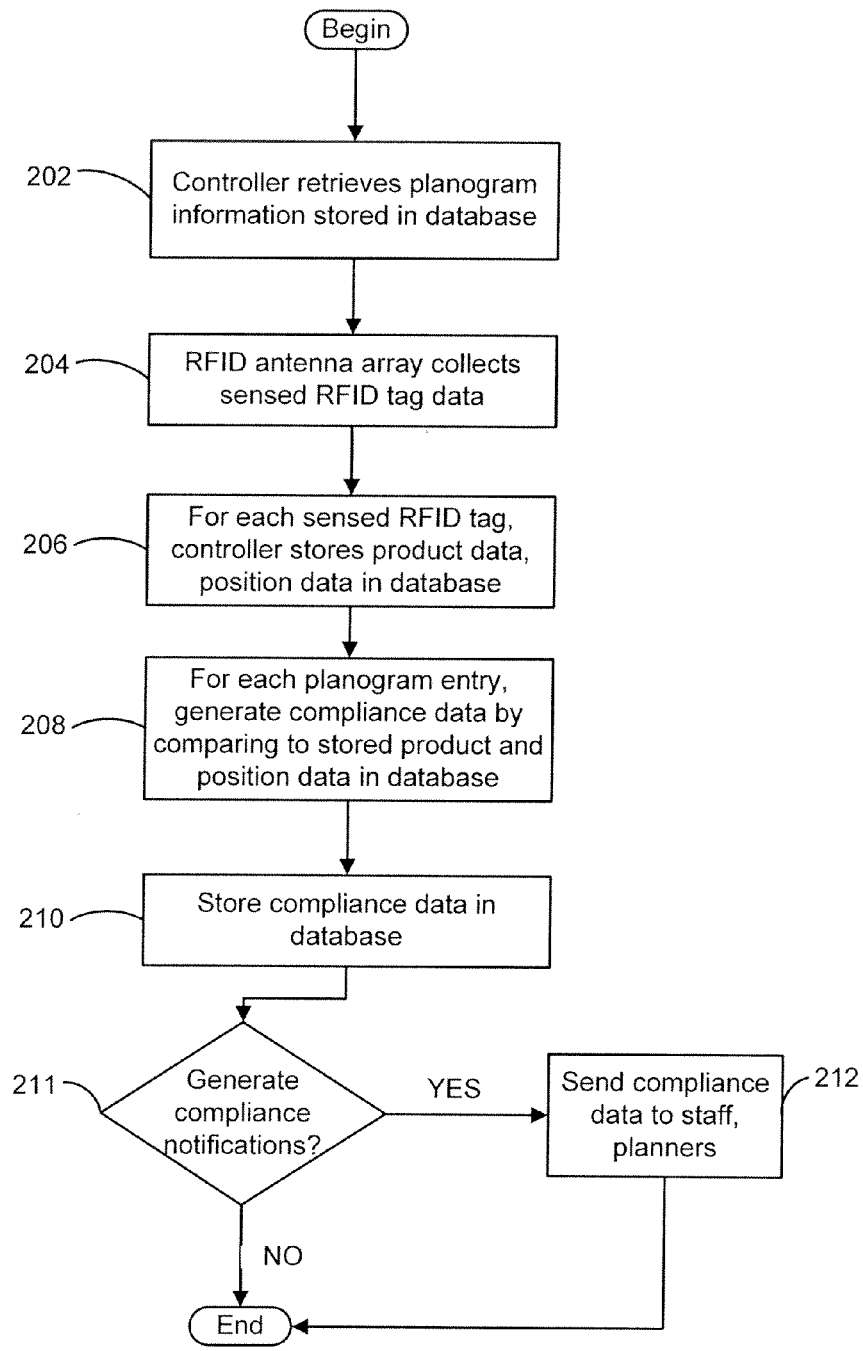
FIGS. 4 and 5 are flowcharts showing steps used to facilitate determination of compliance with a planogram in accordance with the invention.

FIG. 4 illustrates one embodiment of a method 200 for auditing planogram compliance. At block 202, a controller 155 or 126 retrieves a predetermined reference planogram stored in database 146 or 182. The planogram audit engine 171 may be programmed to direct the controller to retrieve a planogram under a variety of circumstances. For example, if a retail location operates on a subscription model (described in more detail in FIG. 5, below), the controller may retrieve a planogram on a regular time interval. Retail staff or central planners may also manually execute a planogram retrieval via a workstation 128 or client device terminal 128A.

At block 204, the antenna array reads data stored in RFID tags embedded with products displayed for sale on a sales floor 19. Also at block 204, the array triangulates positional data associated with each sensed tag. At block 206, the controller 155 or 126 stores the positional and stored data collected from each RFID tag in block 204 in database 146 or 182. The audit engine 171 may now at block 208 execute a comparison of the data collected from each RFID tag with the corresponding entry in said planogram retrieved in block 202. At block 210, the controller stores the compliance data generated in block 208 in database 146 or 182.

The method 200 may optionally generate compliance notifications at block 212. The audit engine 171 may be programmed to notify predetermined recipients via e-mail or other electronic communication of the compliance data relating to the audit performed at block 208. For instance, a retail facility manager may receive a notification if his retail facility fails to meet a predetermined threshold of planogram compliance or if the audit reveals noncompliance in a predetermined subset of the planogram. Central planners may also receive notifications based on a predetermined compliance rules at block 211.

Figure 5:
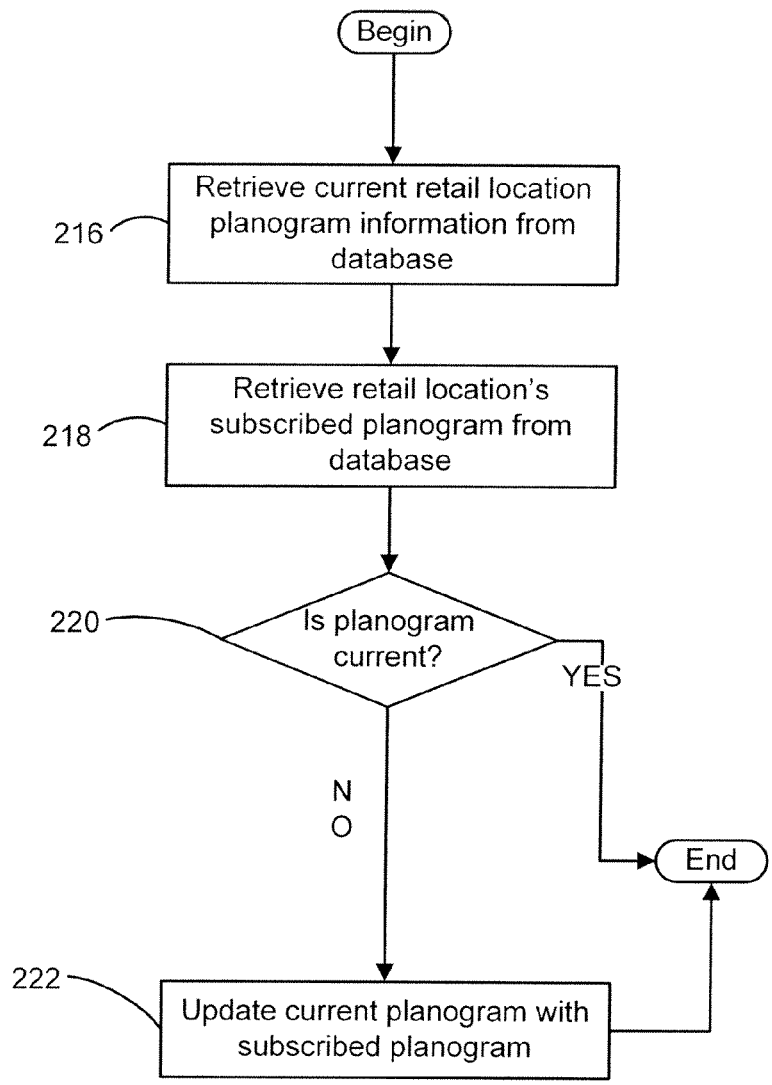

Referring now to FIG. 5, the planogram retrieval in block 202 shown in FIG. 4 may be performed as part of a retail facility's subscription to a regular planogram update. In this embodiment, the planogram audit engine 171 is programmed at block 216 to direct the controller 155 to retrieve current planogram information relating to a retail location stored at database 182 or 146. The engine 171 is further programmed to direct controller 155 to retrieve a subscribed planogram corresponding to the same retail location from database 146. At block 220, the audit engine 171 compares the planogram retrieved in block 216 with the subscribed planogram retrieved in block 218. If the subscribed planogram contains changes with respect to the retrieved planogram, the audit engine 171 is programmed at block 222 to update the current planogram with the subscribed planogram in the database 146 or 182.

The invention claimed is:

1. A method of auditing compliance with a predetermined planogram, the method comprising:
   embedding with products displayed on a sales floor a plurality of RFID tags configured to store a set of associated product data by affixing the tags to a plurality of planograming shelf strips;
   locating a plurality of RFID antennas within range of the sales floor;
   receiving, at the plurality of RFID antennas, a signal corresponding to each embedded RFID tag;
   triangulating, based on the received signals, the position of each RFID tag with respect to a reference location on the sales floor;
   obtaining the set of associated product data stored on each embedded RFID tag;
   obtaining from a memory a predetermined planogram corresponding to the sales floor;
   auditing the sales floor's compliance with the planogram based on said triangulated positions and said obtained associated product data sets;
   storing the audit results in a database.

2. The method of claim 1, wherein the associated product information stored in the embedded RFID tags includes any one of product department name, product Stock Keeping Unit (SKU) numbers, a value corresponding to linear feet of shelf space, a product creation date, a product expiration date, a product sell-by date, a sale price, a volume discount price, an extended product description, a Universal Product Code (UPC) bar code, a price per unit volume, advertising copy, an identification number, a display date, or a planogram reference identifier.

3. The method of claim 1, further comprising aggregating statistics associated with the planogram audit.

4. The method of claim 1, further comprising notifying predetermined individuals of the planogram audit or planogram audit results.

5. The method of claim 1, further comprising aggregating the audit results in accordance with a predetermined format.

6. A system configured to audit a sales floor's compliance with a predetermined planogram, the system comprising:
   a processor;
   a plurality of RFID antennas;
   a plurality of RFID tags having product data sets stored therein and embedded with products displayed on the sales floor, the RFID tags affixed to a plurality of planogramming shelf strips;
   a planogram database storing a plurality of predetermined planograms, with at least one planogram corresponding to the sales floor;
   an audit database configured to store a plurality of audit results;
   a program memory coupled to said processor;
   planogram auditing engine instructions, resident in said program memory, executable by said processor, configured to collect the product data stored in, and triangulate the position relative to a reference location of, said RFID tags via said RFID antennas, to audit said sales floor's compliance with said corresponding planogram with respect to the collected product data sets and triangulated positions, and to store the audit results in the audit database.

7. The system of claim 6, wherein the associated product data set includes one or more of product SKU numbers, a value corresponding to linear feet of shelf space, a product creation date, a product expiration date, a price, a volume discount price, an extended product description, a UPC bar code, a price per unit volume, advertising copy, an identification number, a display date, or a planogram reference identifier.

8. The system of claim 6, wherein the planogram auditing engine further includes instructions to aggregate planogram compliance data in accordance with a predetermined format.

9. The system of claim 6, wherein the planogram auditing engine further includes instructions to notify predetermined recipients of the audit results.

10. The system of claim 6, wherein the planogram auditing engine further includes instructions to aggregate statistics associated with the audit results and audit results from another audit stored in the audit database.

11. A system configured to audit a sales floor's compliance with a predetermined planogram, the system comprising:

means for retrieving a predetermined planogram corresponding to the sales floor;
   means for embedding with products displayed on a sales floor a plurality of RFID tags configured to store associated product data sets, the RFID tags affixed to a plurality of planograming shelf strips;
   means for receiving signals corresponding to embedded RFID tags;
   means for triangulating the position of each RFID tag with respect to a reference location on the sales floor;
   means for obtaining the sets of associated product data stored on each embedded RFID tag;
   means for auditing the sales floor's compliance with the planogram based on said triangulated positions and said collected associated product data sets;
   means for storing the audit results in a database.

12. The system of claim 11, further comprising means for notifying predetermined recipients of the audit results.

* * * * *